United States Patent [19]

Theis

[11] Patent Number: 4,982,420
[45] Date of Patent: Jan. 1, 1991

[54] RECORDING SYSTEM WITH RESPONSE CATEGORIZATION

[76] Inventor: Peter F. Theis, 3203 Bay View La., McHenry, Ill. 60050

[21] Appl. No.: 162,800

[22] Filed: Mar. 1, 1988

[51] Int. Cl.[5] ............................................. H04M 1/65
[52] U.S. Cl. ....................................... 379/68; 379/70; 379/74; 379/84
[58] Field of Search .................... 379/68–88, 379/92, 97, 99, 201, 214; 434/319–324, 308, 309, 335, 336, 350, 351, 362; 381/43, 44; 364/513.5

[56] References Cited

U.S. PATENT DOCUMENTS

| 4,150,255 | 4/1979 | Theis et al. | |
| 4,152,547 | 5/1979 | Theis | |
| 4,302,630 | 11/1981 | Ingegnoli et al. | 379/77 |
| 4,338,494 | 7/1982 | Theis | |
| 4,539,436 | 9/1985 | Theis | |
| 4,591,664 | 5/1986 | Freeman | 379/77 |

Primary Examiner—Stuart S. Levy
Assistant Examiner—James E. Tomassini
Attorney, Agent, or Firm—Willian Brinks Olds Hofer Gilson & Lione

[57] ABSTRACT

A system which presents a user with a sequence of prompt messages and stores user responses to at least selected ones of these prompt messages, classifies the stored user responses in a first category when the user responds to a first one of the prompt messages and not to a second one of the prompt messages, and classifies the stored user reponses in a second category when the user responds to both the first and second prompt messages. In addition, this system classifies the stored user response in a third category when the response includes any one of a plurality of code words, and in a fourth category when the user response includes none of these code words. An alternate embodiment classifies stored user responses in accordance with the duration of the response to a selected prompt message. The described classification techniques materially enhance transcription efficiency.

34 Claims, 5 Drawing Sheets

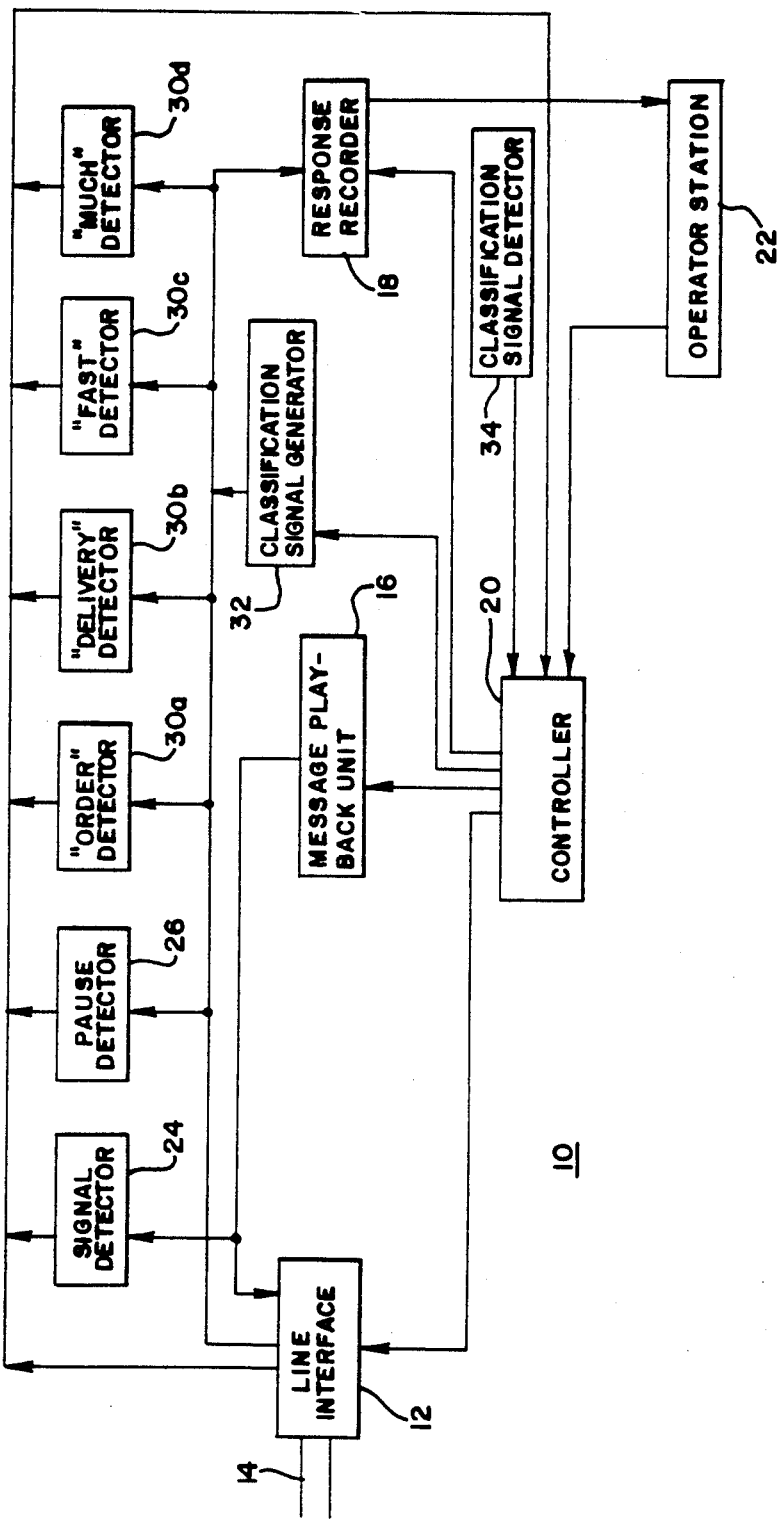

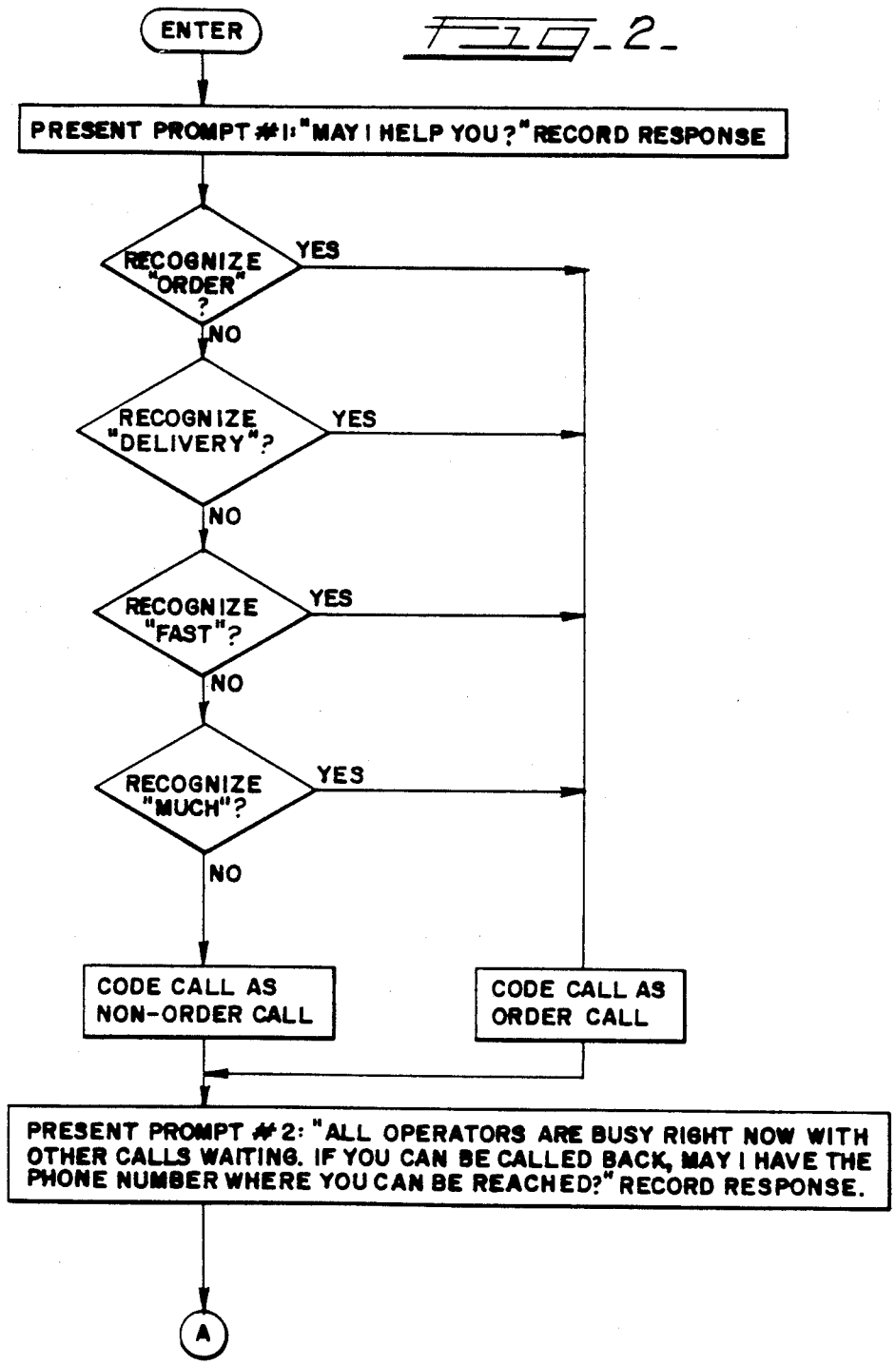

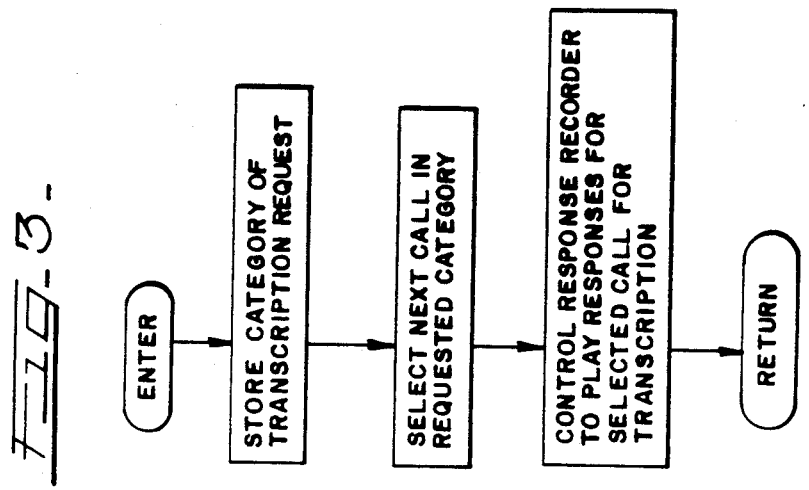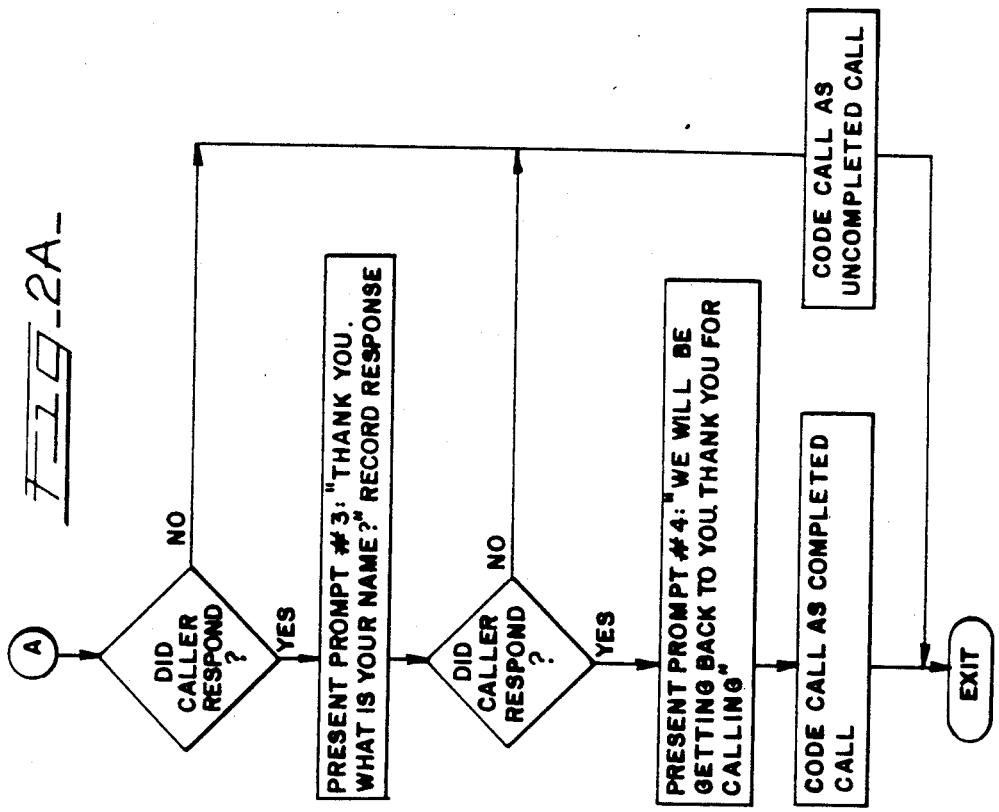

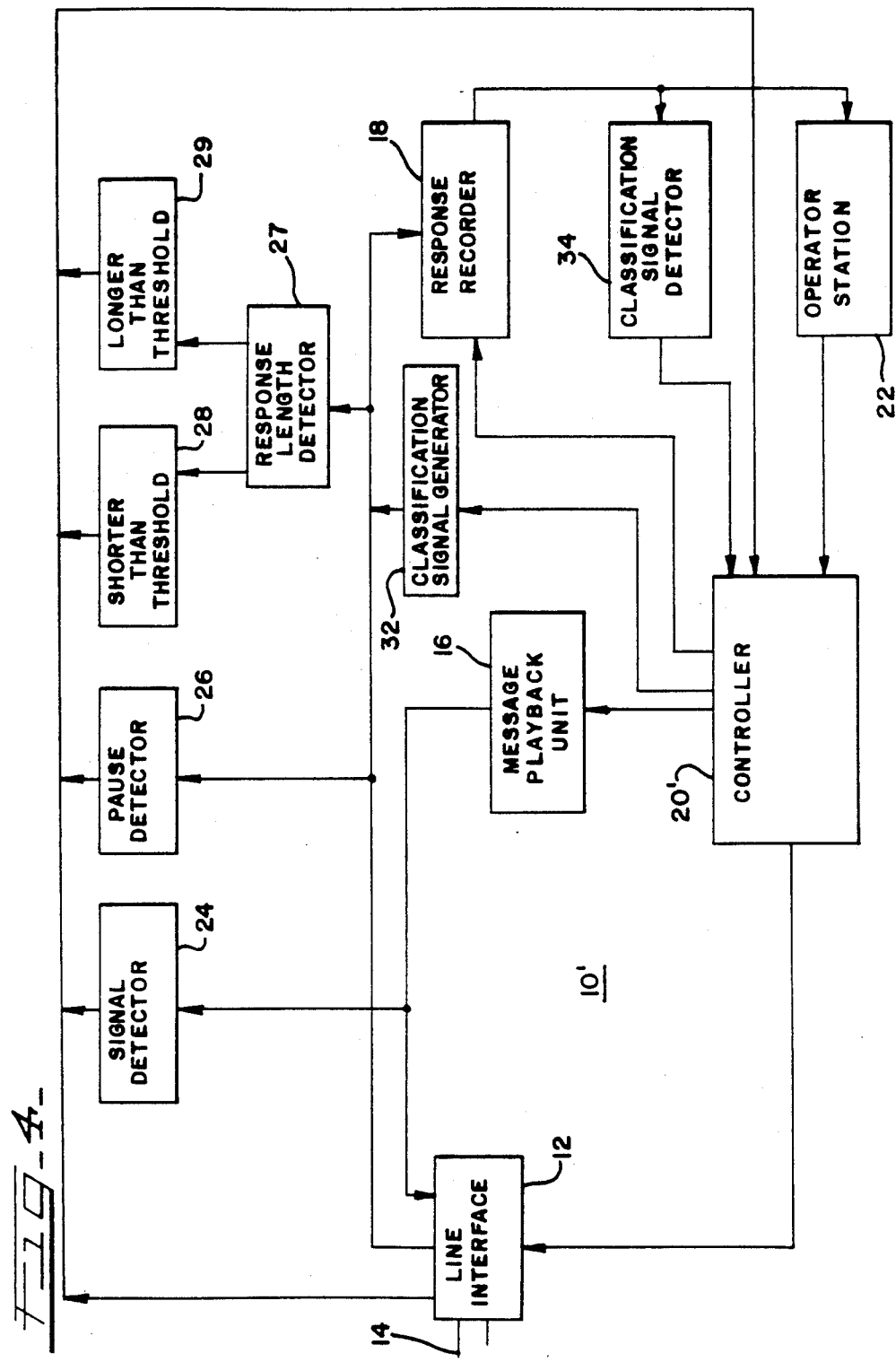

RECORDING SYSTEM WITH RESPONSE CATEGORIZATION

BACKGROUND OF THE INVENTION

This invention relates to systems of the type that store responses from a plurality of users, and in particular to such systems which categorize the stored user responses.

A commonly encountered problem with many recording systems such as question and answer machines relates to the manner in which the stored responses are replayed. Typically, it is necessary to hear all of the stored responses in order to find a set of responses pertaining to a particular topic. Thus, a person listening to stored responses on a typical telephone answering machine must listen to each stored response in turn in order to reach any particular response, regardless of the purpose of the individual calls. In other words, many conventional answering machines do not categorize stored voice messages relating to one topic from stored voice messages relating to a second topic.

In an attempt to overcome this problem, some systems in the past have been equipped with word recognition circuits which respond to selected code words. Typically, the caller is requested to speak one of the selected code words in order to define the type of call. This approach requires the caller to cooperate with the recorded system, and it only groups those calls in which the caller properly speaks the required word.

Another approach of the prior art is to request the caller to depress a selected key on a telephone instrument. The response recording system then recognizes the associated tones and uses this information to classify the call. This approach also requires the caller to cooperate with instructions provided to the caller by the recording system. Additionally, this approach requires the caller to have the appropriate signalling hardware, such as a touchtone keypad.

The present invention is directed to an improved system that automatically categorizes caller responses, without requiring the caller to use signalling hardware, and without requiring the caller to cooperate with instructions by speaking requested code words.

SUMMARY OF THE INVENTION

A first feature of this invention relates to a system which presents a user with a sequence of prompt messages and acts upon the responses to selected prompt messages to classify the user responses in a first category when the user responds to one of the prompt messages and not to the other, and a second category when the user responds to both of the prompt messages. Alternatively, the stored user responses can be classified based on the length of the user response to a selected prompt message.

This feature of the invention can be used to store user responses from completed calls in a first storage sector and to store user responses from uncompleted calls, in which the user did not respond to all of the prompt messages, in a second storage sector. An operator can then retrieve the user responses in the first category from the first storage sector first for transcription and action. The uncompleted calls of the second category can be handled with lower priority. Similarly, calls with excessively long or excessively short responses to a particular prompt message can be categorized for high priority retrieval.

According to a second feature of this invention, a system of the type that presents a user with at least one prompt message and records at least a portion of the user voice response is provided with at least first and second expression recognition means for generating first and second signals when a user voice response includes first and second expressions, respectively. The user response is classified in a first category when either one of the first and second signals is generated, and the user response is classified in a second category when neither of the first and second signals is generated.

This second feature of the invention utilizes a probabilistic approach to categorize the user voice response. If the user response includes any one of a plurality of selected expressions or words, the response is classified in a first category. For example, if it is desired to segregate user responses relating to sales orders from user responses relating to other topics, the word recognition means should be adapted to detect words characteristically used in placing a sales order. If the user uses any one of these words, it is likely that the topic of the call is a sales order. This approach differs from the prior art approach of recognizing code words requested by the recording system in that any one of a plurality of words will cause the user response to be classified in the first category.

The invention itself, together with further objects and attendant advantages, will best be understood by reference to the following detailed description, taken in conjunction with the accompanying drawings.

BRIEF DESCRIPTION OF THE DRAWINGS

FIG. 1 is a block diagram of a telephone recording system which incorporates a first presently preferred embodiment of this invention.

FIGS. 2 and 2A shows a flowchart illustrating one mode of operation of the embodiment of FIG. 1.

FIG. 3 is a flowchart illustrating the manner in which recorded messages can be transcribed by category in the embodiment of FIG. 1.

FIG. 4 is a block diagram of a telephone recording system which incorporates a second preferred embodiment of this invention.

DETAILED DESCRIPTION OF THE PRESENTLY PREFERRED EMBODIMENTS

Figure 5:
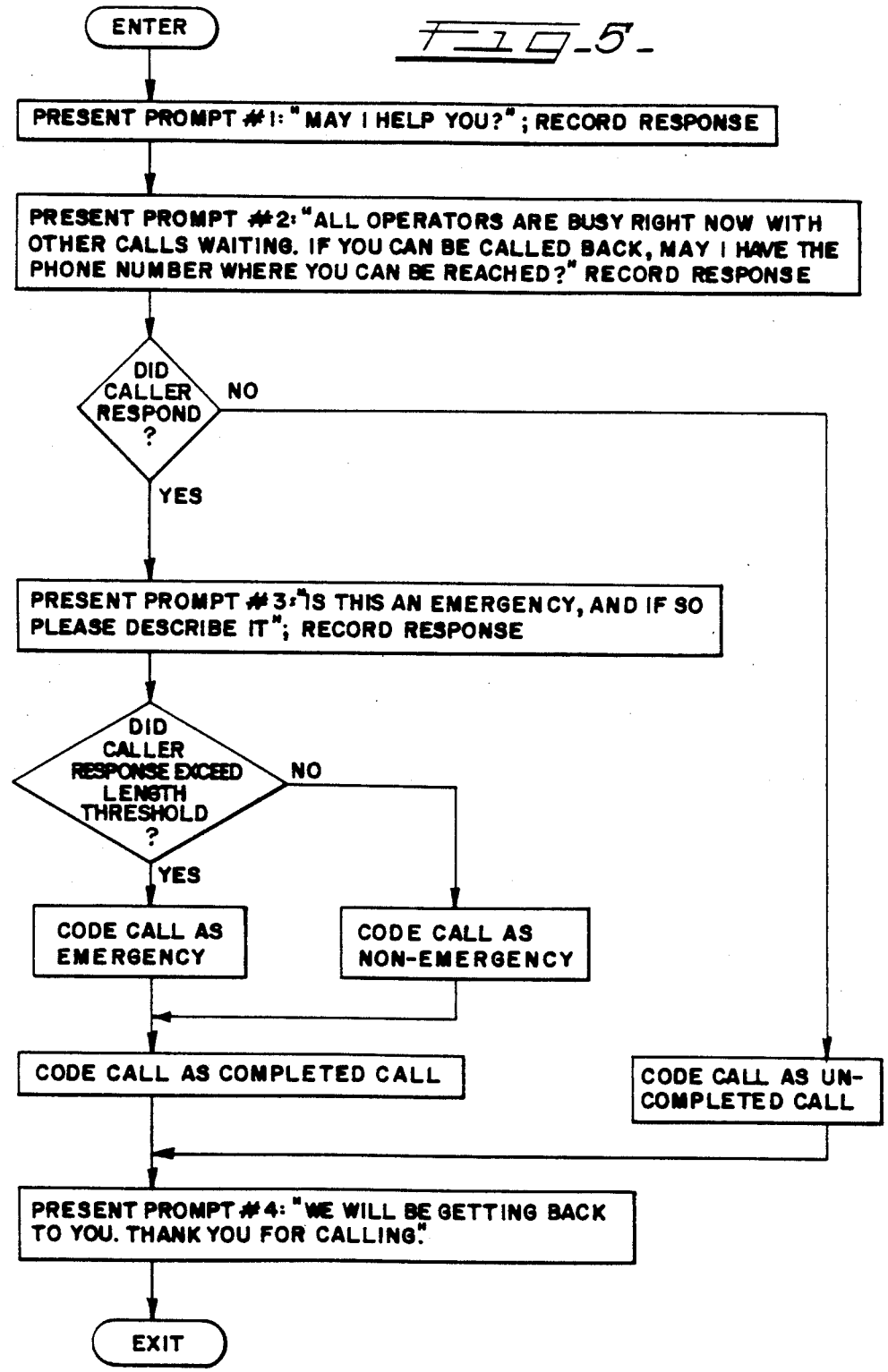
FIG. 5 is a flowchart illustrating one mode of operation of the embodiment of FIG. 4.

Turning now to the drawings, FIG. 1 shows a block diagram of a telephone recording system 10 which incorporates a first presently preferred embodiment of this invention. This recording system 10 includes a line interface 12 which is connected to a telephone line 14 in response to a ring signal and to terminate the connection on command of a controller 20.

The recording system 10 also includes a message prompt unit 16 which is coupled to the line interface 12 to play selected prerecorded prompt messages via the line interface 12 to the telephone line 14, under control of the controller 20. The recording system 10 also includes a response recorder 18 which is controlled by the controller 20 to record caller responses received by the line interface 12 via the telephone line 14.

A signal detector 24 monitors the prompt messages played by the unit 16. Each of the prompt messages includes a coded signal such as a tone at the end of the message, and the signal detector 24 generates a signal in response to these coded signals which is read by the controller 20. Thus, by monitoring the output of the signal detector 24 the controller can determine precisely when a prompt message has been completed.

A pause detector 26 which in this embodiment is a syllabic detector monitors caller responses transmitted from the line interface 12 to the response recorder 18. The pause detector 26 generates an output signal which is in a first logic state during speech portions of the caller response and is in a second logic state during pauses in the caller response characterized by an absence of speech. The controller 20 monitors the output of the pause detector 26 to determine when a caller has paused in his response. A pause of suitable duration is taken as indicative of the end of a caller response.

In operation, the line interface 12 seizes the line 14 in response to a ring signal. Once the line has been seized the controller causes the prompt unit 16 to present the caller with a first prompt message. At the end of this first prompt message the controller stops the prompt unit 16 and starts the response recorder 18. The response recorder 18 records the caller voice response until the caller pauses for a sufficient time to cause the controller 20 to stop the response recorder 18 and to initiate playback of the next prompt message by the unit 16. In this way the recording system 10 conducts a programmed conversation with the caller on the line 14, alternating prompt messages from the prompt unit 16 with caller voice responses that are recorded on the response recorder 18. At the conclusion of the programmed conversation the controller 20 causes the line interface 12 to terminate the connection.

Once the responses of a call have been recorded on the response recorder 18, these recorded responses can be transcribed by an operator at an operator station 22. The operator at the operator station 22 requests the controller 20 to play back caller responses from the recorder 18. Information such as the name, telephone number and purpose of the call can then be transcribed by the operator at the operator station 22 to allow the operator or other personnel to handle the call.

The features of the recording system 10 described above are standard features of conventional recording systems well known to those skilled in the art. For example, Theis U.S. Pat. No. 4,539,436 discloses one such recording system. The ConMode system marketed by Conversational Voice Technologies Corporation of Gurnee, Illinois, operates in the manner described above. These conventional aspects of the recording system 10 will not be described in greater detail here.

According to this invention, the recording system 10 categorizes caller responses recorded in the response recorder 18 as shown in the flowchart of FIG. 2. As described below, two separate techniques are used to categorize caller responses and to facilitate efficient transcription.

The recording system 10 includes four word recognition circuits 30a–30d. Each monitors the caller voice responses transmitted from the line interface 12 to the response recorder 28, and each produces an output signal that is applied to the controller 20 and indicates whether or not a particular selected word has been detected in the caller response. In the embodiment of FIG. 1, the four word recognition circuits 30a–30d detect the four words, "order," "delivery," "fast" and "much," respectively. These four words are found in phrases that an unrehearsed caller is likely to use in calling about an order, phrases such as (1) I'd like to order . . . , (2) What delivery are you quoting . . . , (3) How fast can I get . . . , and (4) How much do . . . cost?

The recording system 10 also includes a classification signal generator 32 which associates any one of four separate code signals with the audio input of the response recorder 18 under command of the controller 20. As explained below, these code signals are used to classify or categorize recorded caller responses. A classification signal detector 34 is coupled to the output of the response recorder 18 to detect code signals associated with the caller responses by the classification signal generator 32. The output of the detector 34 is supplied to the controller 20 as an indication of the classification of the caller response.

As shown in FIG. 2, in one exemplary programmed conversation, the recording system 10 executes the program of FIG. 2 once the line has been seized by the line interface 12. First the recording system 10 presents the first prompt message to the caller and records the caller response. In this embodiment the first prompt message is the general question, "This is XYZ Corporation. May I help you." After the caller's response to this question has been recorded, the controller 20 then reviews the output signals of the word recognition circuits 30a through 30d to determine if any one of the selected words has been detected in the caller response. In the event the caller response includes any one or more of these selected words, the controller 20 codes the call as an order call. In the event the caller response does not include any one of these four words, the controller 20 codes the call as a non-order call.

Depending upon the circuitry used to implement the controller 20, a wide variety of approaches can be used to code calls as either order calls or non-order calls. For example, in the embodiment of FIG. 1, the controller 20 simply causes the signal generator 32 to generate one of two separate code tones at separate respective frequencies, depending upon the classification of the caller response. These code tones are then recorded by the response recorder 18 in association with the respective response. For example, calls which have been classified as order calls can be designated with a code tone at eight kilohertz while calls categorized as non-order calls can be designated with a code tone at nine kilohertz. In alternative embodiments, the response recorder 18 can include separate storage sectors and the controller 20 can record the caller responses of a call in a separate respective sector depending upon the classification of the call. Separate storage sectors can correspond to separate magnetic tapes or disk files, for example. As yet another approach, if the response recorder 18 provides an address for the start of each call, as for example the location on a tape or disk or the location in a digital memory, the calls can be classified simply by storing the starting address of each call in an appropriate index.

Once the call has been coded as either an order call or non-order call, the recording system 10 then presents the caller with a second prompt message which requests the caller to leave a telephone number where he can be reached, and the caller's response to this message is stored. The controller 20 then checks to determine whether the caller has in fact responded to the second prompt message. This is done by monitoring the output of the pause detector 26. A complete absence of speech following the second prompt message is taken as an indication that the caller has failed to respond to the second prompt message. In the event the caller fails to respond to the second prompt message, the controller 20 classifies the call as an uncompleted call.

The controller 20 then causes the third prompt message to be played to the caller, requesting the caller's name. The caller's response is stored and once again the controller 20 monitors the output of the pause detector 26 to determine whether or not the caller has in fact responded. If not, the call is classified as an uncompleted call.

Otherwise, the final prompt message is played and the call is then classified as a completed call.

As explained above, the call can be classified as either a completed or an uncompleted call in various ways. In the embodiment of FIG. 1, calls are classified by storing code signals in conjunction with the recorded caller responses. Of course, code signals do not have to be stored with all caller responses, and the absence of a code signal may be used to designate one of the classifications. Alternatively, completed and uncompleted call responses can be recorded on separate storage sectors, or an index can be assembled.

FIGS. 4 and 5 relate to a second preferred embodiment 10' which is similar in many respects to the first preferred embodiment 10 described above. Corresponding components are designated by the same reference numbers in FIGS. 1 and 4, and their description will not be repeated here. The embodiment 10' includes the devices described above that allow a programmed conversation to be conducted with a caller, with stored prompt messages alternating with caller responses that are stored on the response recorder 18.

In order to categorize calls to aid efficient handling of the stored caller responses, the embodiment 10' includes a response length detector 27 which measures the length of each voice response. This can be accomplished with a conventional syllabic detector and a pair of timers. The first timer is reset at the beginning of each response and measures the duration of the response, and the second timer is reset at the beginning of each pause and measures the duration of each pause. When the second timer reaches a preset value (such as six seconds) the response is assumed to be over and the value of the first timer is a measure of the duration of the caller's response. The response length detector then compares the duration of the response with a threshold value (such as eight seconds) and then activates one of two circuits 28, 29, depending on the outcome of the comparison. If the response is shorter than the threshold value, then the circuit 28 is activated to signal this result to the controller 20'. Similarly, if the response is longer than the threshold value, then the circuit 29 is activated to signal this result to the controller 20'. Of course, the threshold value does not have to be a fixed value, and may be set by the controller so as to be changed in time as appropriate.

The embodiment 10' categorizes calls as completed or not and additionally categorizes caller responses based on the duration of the response to a selected prompt message. FIG. 5 illustrates one preferred mode of operation. As shown in FIG. 5, the first and second prompt messages are presented and the caller responses are stored in the usual manner. The controller 20' then checks to determine whether the caller responded to the second prompt message. If not, the stored responses are coded as an uncompleted call and the final message is played.

However, if the caller did respond to the second prompt message, then the third prompt message (asking whether an emergency exists and requesting a description if an emergency exists) is played to the caller and the response is stored, then the controller 20' checks the outputs of the circuits 28, 29 to determine whether the caller's response to the third prompt message exceeded the length threshold. If so, the caller is presumed to have described an emergency and the call is classified as an emergency. Otherwise the call is classified as a non-emergency. In either case, the call is classified as a completed call and then the final prompt message is played. In this way the duration of the caller response to a selected prompt message is used to classify the stored caller responses.

From the foregoing discussion it should be apparent that the recording systems 10, 10' automatically classify or categorize stored caller responses, both as to the probable purpose of the call, and as to whether or not the call was completed. This classification significantly increases the efficiency with which the calls can be transcribed. During transcription, an operator requests the controller 20, 20' to play back stored responses of calls in a particular classification. As shown in FIG. 3, the controller stores the category or classification of the transcription request, and then selects the set of caller responses corresponding to the next call in the requested category. The controller then controls the response recorder 18 to play back the stored caller responses for the selected call for transcription. In the embodiment of FIG. 1, the controller 20 monitors the detector 34 for the appropriate code signals, and plays back only calls which have the desired code signals.

For example, if the operator is interested only in transcribing caller responses from completed calls relating to orders or to emergencies, the operator can request to hear only caller responses from calls coded as order calls and coded as completed calls, or only caller responses from calls coded as emergency calls and coded as completed calls. In this way, the operator is spared the inefficiency of having to listen to initial caller responses of uncompleted calls, where it is not possible to place a callback. Similarly, in this way the operator can selectively transcribe the majority of order or emergency calls before transcribing other, less time-critical calls.

It is also important to note that in grouping the caller responses according to the purpose or topic of the call, the recording system of FIG. 1 recognizes a number of separate words, and groups the call in a selected classification if any one of these words is recognized in the caller's response. There is a high probability that a caller using any one or more of the selected words is calling about some aspect of an order, as opposed to a bill, store hours or the like. Although this classification approach may not function perfectly in all cases, it does separate calls into groups depending upon the purpose of the caller with sufficient accuracy to improve the operational call handling capabilities of the system 10.

This is accomplished without requiring the caller to use a touchtone signal or to repeat a code word contained in the prompt message. This is because the recognized words are incidental to a normal answer to the prompt message, and are not code words spoken as the answer to a question in the prompt message or as a response requested in the prompt message.

Of course, it should be understood that a wide range of changes and modifications can be made to the preferred embodiment described above. For example, the recording system 10 can be linked with other systems, such as the conversational call distributor described in Theis U.S. Pat. No. 4,539,436, so that callers who do not respond to a particular prompt message are directed to an operator who hears the information previously provided by the caller before answering the call live. Similarly, the classification approaches described above can be used to modify the programmed conversation. For example, if a caller fails to respond and therefore cannot be called back, the final prompt message may be changed to an appropriate message such as: "Thank you for calling and please do call back." In addition, it is not essential that caller responses be stored in an analog fashion. Digital techniques can be used to store caller responses or codes indicative of words included in caller responses, as determined by voice recognition circuits. The word recognition devices 30a–30d can be designed to recognize multi-word expressions such as "sales manager" or "computer department," and the term "expression" is intended to cover both single word and multi-word expressions. Of course, this invention can be used with the full range of communication systems, and is not in all cases limited to use with telephones, and the various classification approaches described above can be used separately or in combination.

It is therefore intended that the foregoing detailed description be regarded as illustrative rather than limiting, and that it be understood that it is the following claims, including all equivalents, which are intended to define the scope of this invention.

I claim:

1. In a system of the type which comprises means for presenting a user with a sequence of prompt messages comprising at least a pair of prompt messages, and means for storing at least a portion of user voice responses to at least one of the prompt messages, the improvement comprising:
   first means for classifying the stored user responses in a first retrieval category for subsequent retrieval by category, said first means operative when the user responds to one of the pair of prompt messages and not to the other one of the pair of prompt messages; and
   second means for classifying the stored user responses in a second retrieval category for subsequent retrieval by category, said second means operative when the user responds to both of the pair of prompt messages.

2. The invention of claim 1 wherein the first and second classifying means store at least a portion of the respective user responses in first and second storage sections, respectively.

3. The invention of claim 1 wherein the first and second classifying means store first and second code signals in association with the stored user responses in the first and second retrieval categories, respectively.

4. The invention of claim 1 further comprising means for selecting the stored user responses by category for processing.

5. The invention of claim 1 further comprising:
   means for separately classifying the stored user responses for subsequent retrieval when the user response to a selected one of the prompt messages is shorter in duration than a threshold value.

6. In a response storage system adapted for use with a telecommunications system, wherein the response storage system comprises means for presenting a user with the sequence of prompt messages comprising at least a pair of prompt messages, and means for storing at least a portion of user voice responses to at least one of the prompt messages, and wherein the prompt messages and the user voice responses are transmitted via the telecommunications system to and from the user, the improvement comprising:
   first means for classifying the stored user responses in a first retrieval category for subsequent retrieval by category, said first means operative when the user responds to one of the pair of prompt messages and not to the other one of the pair of prompt messages; and
   second means for classifying the stored user responses in a second retrieval category for subsequent retrieval by category, said second means operative when the user responds to both of the pair of prompt messages.

7. The invention of claim 6 wherein the first and second classifying means store at least a portion of the respective user responses in first and second storage sectors, respectively.

8. The invention of claim 6 wherein the first and second classifying means store first and second code signals in association with the stored user responses in the first and second retrieval categories, respectively.

9. The invention of claim 6 further comprising means for selecting the stored user responses by category for processing.

10. The invention of claim 6 further comprising:
    means for separately classifying the stored user responses for subsequent retrieval when the user response to a selected one of the prompt messages is shorter in duration than a threshold value.

11. In a system of the type which comprises means for presenting a user with at least one prompt message and means for storing at least a portion of a user voice response to the prompt message, the improvement comprising:
    first expression recognition means for generating a first signal when said user voice response includes a first expression;
    second expression recognition means for generating a second signal when said user voice response includes a second expression;
    first means for classifying the stored user response in a first retrieval category for subsequent retrieval by category, said first means operative when either one of the first and second signals is generated; and
    a second means for classifying the stored user response in a second retrieval category for subsequent retrieval by category, said second means operative when neither one of the first and second signals is generated.

12. The invention of claim 11 wherein the first and second classifying means store at least a portion of the respective user responses in first and second storage sectors, respectively.

13. The invention of claim 11 wherein the first and second classifying means store first and second code signals in association with the stored user responses in the first and second retrieval categories, respectively.

14. The invention of claim 11 further comprising means for selecting the stored user responses by category for processing.

15. The invention of claim 11 further comprising:
    means for separately classifying the stored user responses for subsequent retrieval when the user response to a selected one of the prompt messages is shorter in duration than a threshold value.

16. In a response storage system adapted for use with a telecommunications system, wherein the response storage system comprises means for presenting a user with at least one prompt message, and means for storing at least a portion of a user voice response to the prompt message, and wherein the prompt message and the user voice response are transmitted via the telecommunications system to and from the user, the improvement comprising:
first expression recognition means for generating a first signal when said user voice response includes a first expression;
second expression recognition means for generating a second signal when said user voice response includes a second expression;
first means for classifying the stored user response in a first retrieval category for subsequent retrieval by category, said first means operative when either one of the first and second signals is generated; and
second means for classifying the stored user response in a second retrieval category for subsequent retrieval by category, said second means operative when neither one of the first and second signals is generated.

17. The invention of claim 16 wherein the first and second classifying means store at least a portion of the respective user responses in first and second storage sectors, respectively.

18. The invention of claim 16 wherein the first and second classifying means store first and second code signals in association with the stored user responses in the first and second retrieval categories, respectively.

19. The invention of claim 16 further comprising means for selecting the stored user responses by category for processing.

20. The invention of claim 16 further comprising:
means for separately classifying the stored user responses for subsequent retrieval when the user responses to a selected one of the prompt messages is shorter in duration than a threshold value.

21. In a response storage system of the type which comprises means for processing a user with a prompt message, and means for storing at least a portion of a user voice response to the prompt message, the improvement comprising:
first means for classifying the stored user voice response in a first retrieval category for subsequent retrieval by category, said first means operative when the user response to the prompt message is shorter in duration than the threshold value; and
second means for classifying the stored user voice response in a second retrieval category for subsequent retrieval by category, said second means operative when the user response to the prompt message is longer in duration than the threshold value.

22. The invention of claim 21 wherein the first and second classifying means store at least a portion of the respective user responses in the first and second categories in first and second storage sectors, respectively.

23. The invention of claim 21 wherein the first and second classifying means store first and second code signals in association with the stored user responses in the first and second retrieval categories, respectively.

24. The invention of claim 21 further comprising means for selecting the stored user responses by category for processing.

25. In a response storage system adapted for use with a telecommunications system, wherein the response storage system comprises means for presenting a user with a prompt message, and means for storing at least a portion of a user voice in response to the prompt message, and wherein the prompt message and the user voice response are transmitted via the telecommunications system to and from the user, the improvement comprising:
first means for classifying the stored user voice response in a first retrieval category for subsequent retrieval by category, said first means operative when the user response to the prompt message is shorter in duration than a threshold value; and
second means for classifying the stored user voice response in a second retrieval category for subsequent retrieval by category, said second means operative when the user response to the prompt message is longer in duration than the threshold value.

26. The invention of claim 25 wherein the first and second classifying means store at least a portion of the respective user responses in the first and second categories in first and second storage sectors, respectively.

27. The invention of claim 25 wherein the first and second classifying means store first and second code signals in association with the stored user responses in the first and second retrieval categories, respectively.

28. The invention of claim 25 further comprising means for selecting the user responses by category for processing.

29. In a response storage system of the type which comprises means for presenting a user with a sequence of prompt messages comprising a plurality of prompt messages, and means for storing at least a portion of user voice responses to at least selected ones of the prompt messages, the improvement comprising:
first means for classifying the stored user responses in a first retrieval category for subsequent retrieval by category, said first means operative when the user responds to one of a selected pair of prompt messages and not to the other;
second means for classifying the stored user responses in a second retrieval category for subsequent retrieval by category, said second means operative when the user responds to both of the selected pairs of the prompt messages;
first expression recognition means for generating a first signal when the user response to a selected one of the prompt messages includes a first expression;
second expression recognition means for generating a second signal when the user response to the selected one of the prompt messages includes a second expression;
means for separately classifying the stored user responses for later retrieval when either one of the first and second signals is generated; and
means for separately classifying the stored user responses for later retrieval when neither of the first and second signals is generated.

30. The invention of claim 29 wherein each of the classifying means stores the stored portions of the respective user responses in a separate respective storage sector.

31. The invention of claim 29 wherein each of the classifying means stores a respective code signal in association with the stored user responses.

32. The invention of claim 29 further comprising means for selecting the stored user responses by category for processing.

33. The invention of claim 29 further comprising:

means for separately classifying the stored user responses for later retrieval when the user response to a selected one of the prompt messages is shorter in duration than a threshold value; and means for separately classifying the stored user responses for later retrieval when the user response to the selected one of the prompt messages is longer in duration than the threshold value.

34. The invention of claim 29 wherein the system is adapted for use with a telephone system, and wherein the prompt messages and the user voice responses are transmitted via the telephone system to and from the user.

* * * * *

UNITED STATES PATENT AND TRADEMARK OFFICE
CERTIFICATE OF CORRECTION

PATENT NO. : 4,982,420

DATED : January 1, 1991

INVENTOR(S) : Peter F. Theis

It is certified that error appears in the above-identified patent and that said Letters Patent is hereby corrected as shown below:

In column 2, line 55, after "line" please insert 14 --. The line interface 12 operates to seize the line--.

Column 7:

In claim 2, line 4, please delete "sections" and substitute therefor --sectors--.

Column 8:

In claim 11, line 16, before "second" please delete "a"

Column 9:

In claim 21, line 2, please delete "processing" and substitute therefor --presenting--.

Signed and Sealed this

Twenty-ninth Day of September, 1992

*Attest:*

DOUGLAS B. COMER

*Attesting Officer*     *Acting Commissioner of Patents and Trademarks*